United States Patent [19]

Inoue et al.

[11] Patent Number: 4,911,679
[45] Date of Patent: Mar. 27, 1990

[54] TENSIONER FOR BELTS

[75] Inventors: Hiroyuki Inoue; Yuichi Futami, both of Saitama; Hiroshi Saisho; Kazuharu Yamada, both of Aichi, all of Japan

[73] Assignee: Tsubakimoto Chain Co., Japan

[21] Appl. No.: 379,502

[22] Filed: Jul. 13, 1989

[30] Foreign Application Priority Data

Jul. 14, 1988 [JP] Japan .............................. 63-92450[U]

[51] Int. Cl.$^4$ .............................................. F16H 7/08
[52] U.S. Cl. ...................................... 474/110; 474/138
[58] Field of Search ...................... 474/101, 109–111, 474/133, 135, 136, 138

[56] References Cited

U.S. PATENT DOCUMENTS

| | | | |
|---|---|---|---|
| 4,539,001 | 9/1985 | Okabe | 474/138 |
| 4,674,996 | 6/1987 | Anno et al. | 474/110 |
| 4,708,696 | 11/1987 | Kimura et al. | 474/138 X |
| 4,798,563 | 1/1989 | Okabe et al. | 474/110 |

FOREIGN PATENT DOCUMENTS

| | | | |
|---|---|---|---|
| 56-59051 | 5/1981 | Japan | 474/110 |
| 58-121344 | 7/1983 | Japan. | |
| 63-115657 | 7/1988 | Japan. | |

Primary Examiner—Thuy M. Bui
Attorney, Agent, or Firm—Howson & Howson

[57] ABSTRACT

A hydraulically damped tensioner for a belt transmission system. A piston slidable with clearance in a cylinder form front and rear oil-filled chambers communicating through a passage in the piston with a check valve for restricting flow from the rear chamber to the front chamber. A piston rod is urged through the front chamber and against a roller by a spring in the rear chamber imparting tension on the belt. An opening, sealed by a removable plug, communicate with the front chamber to provide access for filling oil in both chambers.

5 Claims, 2 Drawing Sheets

TENSIONER FOR BELTS

FIELD OF THE INVENTION

The present invention relates generally to a tensioner for belts; and more particularly to a hydraulically actuated tensioner for restricting oil leakage or air infiltration in the hydraulic actuator.

BACKGROUND OF THE INVENTION

It is often necessary to impart tension to a belt in a drive system. For example, where the belt is used for driving a camshaft of an engine, excessive changes in belt tension may occur with wide variations in ambient temperature due to the different coefficients of expansion of the belt and the body of the engine. Vibrations, noise, unmeshing of the teeth, and the like, may result. Accordingly, belt tension must be maintained within a suitable range.

The basic construction and principle of operation of hydraulically actuated belt tensioners are well-known as shown, for example, in U. S. Pat. No. 4,708,696. A piston rod extends from a piston slidably fitted in a cylinder dividing the cylinder into front and rear chambers which are filled with oil. The piston and rod are biased in a protruding direction by a spring.

The pressure within the rear chamber may rise as high as 100 kg/cm$^2$ when a force to cause the piston rod to retract is imparted by the belt. Since the rear chamber is confined by the cylinder and the piston, oil within the rear chamber is unable to flow out of the cylinder and is only allowed to flow into the front chamber through the small clearance between the cylinder and the piston. Therefore, some oil leakage and infiltration of air may occur.

SUMMARY OF THE INVENTION

According to the present invention, an opening is provided in the front chamber side, which is inherently free from significant pressure rise, even if the piston is forced to move. Namely, the pressure within the front chamber could rise, at most, to about 5 kg/cm$^2$ when there is thermal oil expansion. Therefore, oil leakage from the front chamber is almost nil; and in order to seal oil, just to clog a small opening is sufficient.

Furthermore, it is unnecessary to use a tapered screw, and fastening torque control also becomes unnecessary. An opening for filling oil may be machined easily in the form of a simple cylindrical bore and a complementary plug may easily be secured into such a bore.

BRIEF DESCRIPTION OF DRAWINGS

These and other novel features of the invention will become more apparent from the following detailed description when considered in conjunction with the accompanying drawings wherein.

DESCRIPTION OF THE PREFERRED EMBODIMENT

Figure 1:
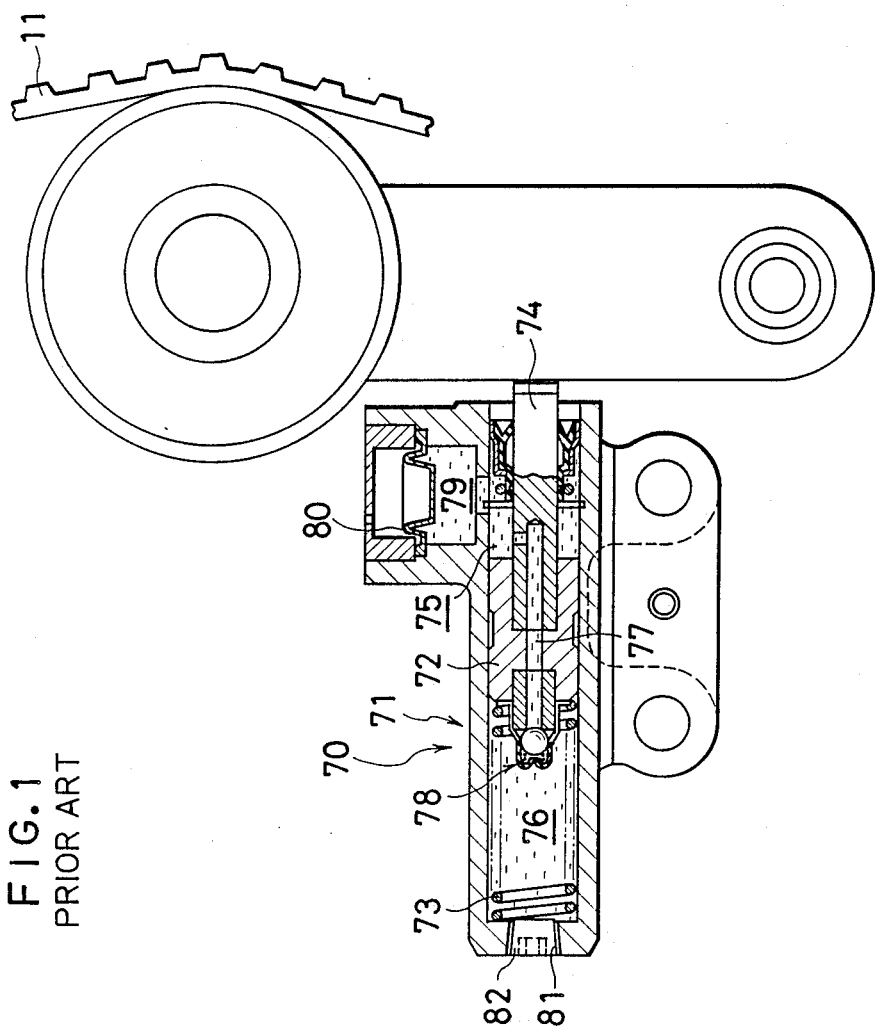
FIG. 1 a is sectional view of a tensioner of the prior art.

Referring now to the drawings wherein like characters designate like or corresponding parts throughout the several views, FIG. 1 shows a known tensioner 70 having a piston rod 74 extending from a piston 72 loosely fitted within a cylinder 71. The piston 72 divides the cylinder 71 into a front chamber 75 and a rear chamber 76 which are filled with oil, and a spring 73 urges the piston rod 74 against a pressure plate or a roller to maintain a desired tension in the belt 11. A passage 77 and a one-way check valve 78 in the piston 72 communicate between the chambers 75, 76 allowing quick retraction when the belt 11 tightens but slow return when it relaxes. The front chamber 75 communicates with an oil reservoir 79 covered by a diaphragm 80 accommodating the difference in volumes caused by the piston rod 74.

In such a tensioner, an opening 81 required for filling oil and a blind plug 82 are provided to the rear chamber 76. The oil pressure within the rear chamber 76 may reach as high as 100 kg/cm$^2$ when the tensioner is in operation. Consequently, there is fear of oil leakage between the opening 81 and the blind plug 82.

A tapered thread has been utilized in opening 81 and plug 82 to reduce oil leakage; however, it is practically impossible to completely prevent oil leakage. Also, there is fear of air infiltration into the rear chamber 76 which will result in tensioner deterioration. Moreover, machining of a tapered screw and torque control in assembly work of a tapered screw is troublesome.

Figure 2:
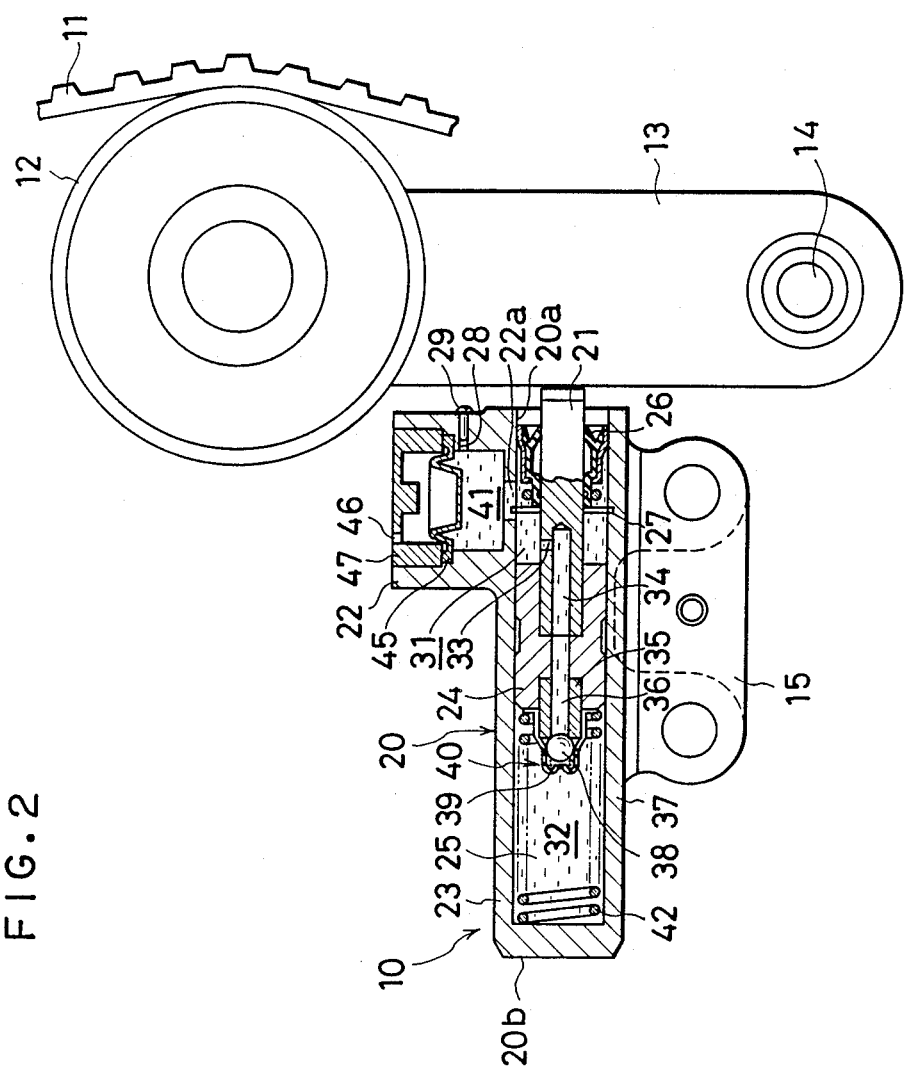
FIG. 2 is a sectional view of a tensioner for a belt according to the invention.

FIG. 2 shows an improved tensioner 10 for a belt 11 according to this invention. A plate 13, pivotally connected with a bolt 14 to support structure (not shown), carries a roller 12 which forcedly contacts a relaxable portion of the belt 11. A piston rod 21 protruding from a cylinder 20 fixed by a lug 15 to a support structure (not shown) urges the plate 13 for tensioning the belt 11.

The cylinder 20 includes a front or reservoir portion 22 and a rear portion or main body 23, and slidably receives the piston 24 with a slight clearance. The piston rod 21 is fixed to the piston 24.

An annular fastener 27 fixed to the cylinder 20 acts as a stopper when the piston rod 21 reaches the fully extended position. A seal 26 about the rod 21 at an opening 20a of the cylinder 20 prevents leakage of oil 25 from the cylinder 20.

The piston rod 21 is provided with an oil passage composed of a lateral hole 33 opening into a front chamber 31 which is defined by the cylinder 20, the piston 24 and the seal 26, and a longitudinal hole 34, subsequent to the lateral hole 33, leading toward a rear chamber 32 which is defined by the cylinder 20 and the piston 24. A valve seat 35, fitted to the piston 24, is provided with a longitudinal hole 36 communicating between the hole 34 and the rear chamber 32.

A compression spring 42 is placed between a retainer 37 and an end surface of the main body 23 of the cylinder 20. A ball spring 39 urges a ball 38 held within the center part of the retainer 37 against the opening of the hole 36 with sufficient force to allow the oil 25 to flow from the front chamber 31 toward the rear chamber 32. A check valve 40 comprises the retainer 37, the ball 38 and the ball spring 39. An oil reservoir 41 accommodates the variation of the volume between the front chamber and the rear chamber when the oil flows in or out of the reservoir 41 due to movement of the piston 24. A diaphragm 45, mounted to the oil reservoir by a cap 47 having an opening 46, separates the oil reservoir 41 from atmosphere.

According to the present invention, no opening is provided to one end portion 20b of the cylinder 20 for filling oil as in the tensioner of FIG. 1. Instead, an opening 28 for filling oil is provided to the reservoir portion 22 communicating with the front chamber 31 which is inherently free from significantly high oil pressure. After oil is completely filled into the front and rear chambers and the oil reservoir 41, a plug 29 is press-fitted into the opening 28 by, for example, hammering.

Operation of the tensioner 10 is summarized as follows. Spring 42 applies an initial tension force to the belt 11 through piston rod 21 and roller 12. When belt 11 relaxes or stretches due to a decrease in ambient temperature, the belt tension decreases and piston rod 21 moves forward under the force of spring 42 to return the belt tension to its original value. That is, hydraulic pressure in front chamber 31 increases due to piston rod 21 advancing. The check valve 40 opens and enables rapid advance of piston rod 21 to effect a quick recovery of the belt tension.

At this time, the pressure within front chamber 31 and oil reservoir 41 is substantially the same as the ambient or atmospheric pressure owing to diaphragm 45.

In a case where belt 11 drives a camshaft of an engine and the engine momentarily rotates in the reverse direction when starting, for example less than one rotation, the tension force of belt 11 increases for a short period and piston rod 21 experiences a high reaction force in the retracting direction. Check valve 40 being closed, piston rod 21 cannot retract quickly and the pressure within rear chamber 32 increases. Then, oil can flow only in the small clearance around piston 20. Piston rod 21 will retract gradually and finally settle at a position where the reaction force and the force of spring 42 are balanced. Thus, roller 12 will quickly take up the slack of belt 11 and prevent it from "leaping" as a loose belt.

As aforementioned, the pressure within rear chamber 32 substantially increases due to the force applied from belt 11. Whereas, the pressure within front chamber 31 and oil reservoir 41 is in effect maintained at the ambient or atmospheric pressure owing to diaphragm 45. Accordingly, no pressure difference will be present inside and outside of oil-filling opening 28 and plug 29. As mentioned before, the pressure within front chamber 31 may rise, at most, to 5 kg/cm$^2$ due to thermal oil expansion. Plug 29, hammered or press-fitted into opening 28, can sufficiently resist such a low pressure.

Moreover, even if air accidentally enters into front chamber 31, it may automatically gather and flow into oil reservoir 41. Therefore, the function of the tensioner will not deteriorate due to air infiltration.

It will be appreciated that the embodiment shown in FIG. 2 is for illustrative purposes only, and should not be construed as limiting the invention.

For example, the opening for filling oil may be provided directly into front chamber 31; check valve 40 may be omitted without affecting operation of the other components; or an accumulator means may be disposed within front chamber 31 in place of oil reservoir 41.

We claim:

1. A tensioner for a belt comprising, in combination:
    a piston rod extending from a piston slidably fitted in a cylinder which is divided by said piston into front and rear chambers filled with oil, said piston rod being biased in a protruding direction by a spring, and port means adjacent to said front chamber for filling said chambers with oil.

2. A tensioner according to claim 1 wherein said port means includes an opening to an oil reservoir communicating with said front chamber.

3. In a tensioner for a belt drive system including a rod extending from a piston slidable in a cylinder with clearance therebetween, the piston dividing the cylinder into first and second chambers filled with oil and a spring urging the rod through the first chamber against the belt, the improvement comprising:
    port means communicating with the first chamber for filling said chambers with oil.

4. The tensioner improvement according to claim 3 wherein the tensioner further includes an oil reservoir communicating with said front chamber, and wherein said port means further comprises:
    an opening to said reservoir; and
    a plug for sealing said opening.

5. A tensioner for a belt transmission system comprising, in combination:
    a cylinder closed at each end;
    a piston slidable in said cylinder with clearance and forming front and rear chambers at either end of said cylinder;
    a spring urging said piston toward the front chamber;
    a rod extending from said piston and through said front chamber for imparting tension to the belt;
    an oil reservoir communicating directly with said front chamber, and including an opening for filling said chambers and reservoir with oil; and
    a plug for sealing said opening.

* * * * *

UNITED STATES PATENT AND TRADEMARK OFFICE
CERTIFICATE OF CORRECTION

PATENT NO. : 4,911,679
DATED : March 27, 1990
INVENTOR(S) : Hiroyuki Inoue

It is certified that error appears in the above-identified patent and that said Letters Patent is hereby corrected as shown below:

On the title page, after "Assignee: Tsubakimoto Chain Co., Japan" insert --Toyota Jidosha Kabushiki Kaisha, Japan--.

Signed and Sealed this

Twenty-eighth Day of April, 1992

Attest:

HARRY F. MANBECK, JR.

*Attesting Officer*     *Commissioner of Patents and Trademarks*